W. B. WILKINSON.
APPARATUS FOR REMOVING SCALE FROM BOILERS.
APPLICATION FILED APR. 3, 1915.

1,207,113.

Patented Dec. 5, 1916.

UNITED STATES PATENT OFFICE.

WILBUR B. WILKINSON, OF NEW YORK, N. Y., ASSIGNOR TO PEROTIN COMPANY OF AMERICA, OF CHICAGO, ILLINOIS.

APPARATUS FOR REMOVING SCALE FROM BOILERS.

1,207,113.          Specification of Letters Patent.          Patented Dec. 5, 1916.

Application filed April 3, 1915. Serial No. 18,997.

*To all whom it may concern:*

Be it known that I, WILBUR B. WILKINSON, a citizen of the United States, residing at New York, in the county of New York, State of New York, have invented certain new and useful Improvements in Apparatus for Removing Scale from Boilers, of which the following is a specification.

My invention relates to an apparatus for removing scale from boilers and has as its principal object the provision of means whereby scale on the interior of boilers and like structures may be quickly and conveniently removed by the direct application of a flame thereto.

A second object of my invention is to provide a burner for use in removing scale by means of a direct application of the oxyacetylene flame, which burner shall be proof against back firing without the necessity for special cooling means.

A third object of my invention is to provide a burner which shall give a flame sufficiently hot to crack scale but which shall not endanger the metal of the boiler.

A final object of my invention resides in the particular arrangement and combination of parts hereinafter described.

It will be understood that previous attempts have been made to remove scale from boilers and the like structures by the direct application of a flame followed by the application of water or other cooling means. Such previous attempts, however, have prooved unsuccessful for various reasons, among which are the difficulties caused by the application of the cooling fluid and the tendency of the apparatus to back fire.

Figure 1:
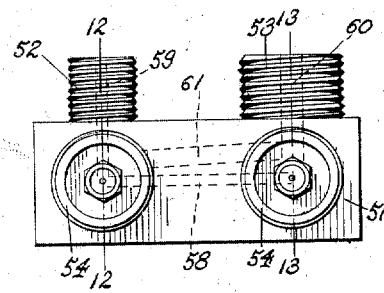
Figure 2:
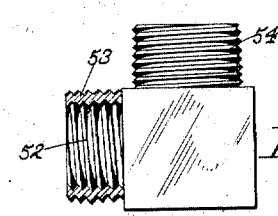
Figure 3:
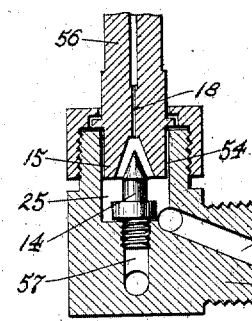
Figure 4:
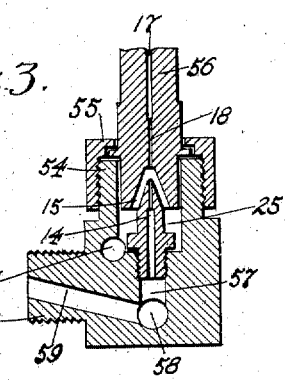

In the accompanying drawings, Figure 1 is a plan view of a two jet burner designed for use in removing scale from the water leg of boilers, the burner tubes and tips being removed. Fig. 2 is an end elevation of the device shown in Fig. 1. Fig. 3 is a sectional view on the line 12—12 of Fig. 1. Fig. 4 is a sectional view on the line 13—13 of Fig. 1, the burner tube being shown in place.

Throughout the separate views the same part is designated by the same reference character.

Referring more particularly to the drawings, I have shown herein a burner adapted for use in restricted places such as the water legs of boilers and which in this form is shown as designed for two burner tips, but it will be understood that three or more may be used if desired. This burner is provided with a solid base or body 51 on one side of which I provide two integral threaded shanks 52 and 53 for connecting to the oxygen and the acetylene pipes respectively. The base 51 is provided also with two threaded shanks such as 54 to which may be attached by means of threaded couplings 55 the burner tubes 56. The shanks 54 are hollowed out to provide chambers 25 and the inner ends of the tubes 56 are so shaped as to provide conical mixing chambers 15. Moreover, leading out from each chamber 25 is a threaded passage 57 in which is fixed a threaded oxygen nozzle 14. The passages 57 connect with a central longitudinal passage 58 so that oxygen is supplied to both the tips 14 from a passage 59 leading into the shank 52 and connecting with the passage 58. The shank 53 is provided with a passage 60 through which the acetylene is supplied and the passage 60 connects with a second longitudinal passage 61 which opens directly into both the chambers 25. It will be seen, moreover, that the burner tubes 56 are provided with longitudinal passages 17 and that such passages are restricted as at 18 where they lead out of the mixing chambers 15. Moreover, the burner tubes 56 will be understood to carry burner tips 19 at the end.

Having thus described my invention, I claim:—

An apparatus for removing scale from boilers comprising in combination a solid base having a longitudinal passage therein and having also air inlet to said passage and a plurality of outlets therefrom, said base having means associated therewith for forming mixing chambers, oxygen tips associated with said outlet passages and projecting into said mixing chambers, said base having a second longitudinal passage therein connecting with said mixing chambers and having a passage leading into said second longitudinal passage, and means for delivering mixed gases away from said mixing chambers.

In testimony whereof I affix my signature in the presence of two witnesses.

WILBUR B. WILKINSON.

Witnesses:
 BRUNO SHENDALS,
 JANIE HAMILTON.

Correction in Letters Patent No. 1,207,113.

It is hereby certified that the assignee in Letters Patent No. 1,207,113, granted December 5, 1916, upon the application of Wilbur B. Wilkinson, of New York, N. Y., for an improvement in "Apparatus for Removing Scale from Boilers," was erroneously described and specified as "Perotin Company of America," whereas said assignee should have been described and specified as *Perotin Company of America*, as shown by the records of assignments in this office; and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 158—27.4.